United States Patent

[11] 3,624,242

| [72] | Inventor | Warren Ray Steinacker<br>Wilmington, Del. |
|---|---|---|
| [21] | Appl. No. | 1,850 |
| [22] | Filed | Jan. 9, 1970 |
| [45] | Patented | Nov. 30, 1971 |
| [73] | Assignee | E. I. du Pont de Nemours and Company<br>Wilmington, Del. |

[54] PROCESS OF MACHINING A METAL IN CONTACT WITH A CUTTING FLUID COMPRISING A CHLOROFLUOROALKANE
1 Claim, No Drawings

[52] U.S. Cl. .................................................. 252/58, 252/15
[51] Int. Cl. ..................................................... C10m 1/30
[50] Field of Search ........................................... 252/15, 58

[56] References Cited
UNITED STATES PATENTS

| 2,291,166 | 7/1942 | Maag .......................... | 252/58 |
| 2,580,654 | 1/1952 | Browning ..................... | 252/15 |
| 2,912,383 | 11/1959 | Hufh ........................... | 252/58 X |
| 3,072,574 | 1/1963 | Buckley et al. ............... | 252/15 X |
| 3,085,116 | 4/1963 | Kvalnes et al. ............... | 260/652.5 |
| 3,129,182 | 4/1964 | McLean ....................... | 252/58 X |

OTHER REFERENCES

Loffler " Chemical Abstracts" Vol. 55 (1961) col 20261.

*Primary Examiner*—Daniel E. Wyman
*Assistant Examiner*—W. Cannon
*Attorney*—Francis J. Crowley

ABSTRACT: The process of machining a metal in contact with a cutting fluid comprising trichlorofluoromethane.

3,624,242

PROCESS OF MACHINING A METAL IN CONTACT WITH A CUTTING FLUID COMPRISING A CHLOROFLUOROALKANE

BACKGROUND OF THE INVENTION

1. Field of the Invention

This invention relates to a process of machining a metal, for example, drilling, routing, tapping threading, broaching, lathe turning or the like, in contact with a cutting fluid comprising trichlorofluoromethane.

2. Description of the Prior Art

The machining of metal has been carried out in contact with various fluids which are recommended and used as cutting fluids. Such fluids of the prior art comprise mineral oils, fats, fatty acids, soaps, sulfonated oils, waxes, oil-water emulsions, etc. The usual shop practice has been to flood the work and tool with a stream of the cutting fluid. Normally the fluid is recovered, especially in large operations, more or less purified, sometimes reconstituted, and then returned for reuse. E. L. H. Bastian summarized the state of the art in his book, Metal Working Lubricants, McGraw-Hill Book Co., Inc., New York, N.Y., (1951).

In field cutting operations as for example in the drilling of a partly assembled air frame, it is impractical to apply the usual shop practice of flooding the tool and work. In the past either no fluid at all was used, at least in the drilling of aluminum alloys, with consequent reduced tool life, or a cutting fluid was applied intermittently by brush or similar means. The nonevaporating fluids of the earlier prior art had to be removed by means such as wiping and frequently with a solvent, especially if the area was to be painted afterwards.

Mc Lean in U.S. Pat. No. 3,129,182 disclosed machining a metal in contact with an evaporative cutting fluid, ethylene glycol monobuty ether in 1,1,2-trichloro-1,2,2-trifluoroethane.

A process has now been discovered for machining of metal which process effects the prolongation of tool life.

SUMMARY OF THE INVENTION

The present invention is directed to a process of machining a metal in contact with a cutting fluid comprising a chlorofluoromethane.

DESCRIPTION OF THE INVENTION

The present invention comprises machining a metal, e.g., drilling, routing, lathe turning, etc., in contact with an evaporative cutting fluid comprising trichlorofluoromethane. In the process of machining a metal, the manner of application of the cutting fluid while not critical is normally selected from two primary methods. The first method is the application of the cutting fluid as a solid stream and the second method is the application of the cutting fluid in droplet form said droplets being dispersed and evaporated in a stream of compressed air by means of a misting nozzle. It has been found that the latter process prolongs tool life substantially more than does the solid stream method. Tool life may also be increased by increasing the rate of application of fluid in both solid stream and misting nozzles. The amount of cutting fluid to be applied will be readily apparent to the one applying and should be sufficient to lubricate and cool the machine when operating. Other compounds, in addition to trichlorofluoromethane may be present in the cutting fluid.

All variables in the manner of application of the fluid are not entirely independent. For example, the employment of larger volumes of air permits the use of lesser amounts of cutting fluid to obtain the same tool life.

Practical limits of application exist as well, for example, with misting nozzles, application of more than about 8 pounds (3.6 kg.) per hour will cause fluid to accumulate on the work. The efficiency of the misting nozzle in terms of dispersion of the fluid droplets in the air and the amount of codispensed air will naturally affect the accumulation of liquid on the work.

In utilizing the process of this invention, one manner in which the cutting fluid may be applied is at the rate of about 4 lbs. (1.8 kg.) per hour through a pressure-drop nozzle with an air pressure of about 47 lbs./sq. in. (3.3 kg./cm.$^2$). In an application of this sort, however, it is preferable to adjust the rate of fluid application and the air pressure according to the quality of the cutting machine and the particular operation.

Precautions should be taken in confined areas to protect personnel from the accumulation of excessively high cutting fluid vapors. Standards set by the American Conference of Governmental Industrial Hygienists allow a Threshold Limit Value (TLV) of 1,000 p.p.m. for the fluorocarbon of this cutting fluid. The vapors of the cutting fluid of this invention are of a low order to toxicity and nonflammable.

The following example is intended to be merely illustrative of the invention and not in limitation thereof. Unless otherwise indicated, all parts are by weight.

EXAMPLES

The utility and effectiveness of the process of this invention were evidenced by a determination of the relative tool life employed in machining metal by said inventive process.

Relative tool life was estimated in drilling by counting the number of holes drilled in aluminum alloy specimens under standard conditions before the cutting edge of the drill, as measured across the flutes at the circumference, had worn away 0.015 inch (0.038 mm.). This was measured by means of a scaled occular 40 power microscope.

The aluminum alloy test specimens consisted of two 4×6 inch (10.2×15.2 cm.), one fourth inch (6.35 mm.) thick plates of 7075-T6 aluminum alloy bolted together. The alloy is described in Chemical Engineer's Handbook, McGraw-Hill Book Co., New York, New York, fourth edition, pp. 23-40 and is commonly used in the aircraft industry. The drill passed through both pieces, i.e., through 0.5 inches (12.7 mm.) of metal.

The test drills used in drilling the aluminum alloy were one fourth inch (6.35 mm.) No. 957 high helix twist drills manufactured by the Cleveland Twist Drill Co. of Cleveland, Ohio. Drills from a single lot were used in each test. The drills turning at 3,640 revolutions per minute were advanced into the work at the steady rates shown in examples.

Cutting fluid was delivered to the work by a nozzle placed at an angle of about 30° to the work and directed to the drill hole.

The nozzle utilized delivered a mist consisting of droplets of the cutting fluid dispersed in a stream of compressed air. It was the so-called "Spraymist" nozzle manufactured by the Bijur Lubricating Corp. of Rochelle Park, N.J. That company's flexible extension jet which they designate B-101 and their jet tip designated B-136 were used. The nozzle is characterized in that compressed air and cutting fluid are supplied to the nozzle head by means of two concentric tubes, the cutting fluid being in an inner tube and the compressed air in an annular space. The concentric tubes enter a spray head of relatively large volume from which the mixture exits at the opposite end through a 0.050-inch (1.27 mm.) diameter hole. There is considerable pressure drop in the spray head and apparently considerable turbulence therein thus assuring good mixing. This nozzle is hereinafter referred to as the pressure-drop nozzle.

In this example the average performance of three drills and the standard deviation in three parallel tests is reported.

In connection with the quality of the cutting machine, it is known that the tool life of drills used to drill aluminum is increased when worn bearings and shaft of an old drill press are replaced with new parts. The findings of this example were made with an old drill press.

EXAMPLE

Comparative Performance of Fluoro- and Chlorofluoro-Compounds as Cutting Fluids in Machining of Metal This example shows the comparative performance of various fluoro- and chlorofluoro-compounds, including trichlorofluoromethane, in aluminum alloy drilling. All of the compounds shown are normally liquids except dichlorodifluoromethane which is normally a gas.

The conditions of the test series were the following:
Application by Pressure-drop nozzle
Fluid flow rate: 4 lbs. (1.8 kg.)/hr.
Air Pressure: 47 lbs./sq. in. (3.3 kg./cm.$^2$)
Drill advance rate: 0.012 inches (0.30 mm.)/revolution
The results are shown in the table below:

TABLE

| Cutting fluid | Performance [1] | Standard deviation (holes/drill) |
|---|---|---|
| None | 54 | 9.3 |
| Perfluorodimethylcyclobutane | 105 | 3.1 |
| 1,1,2-Trichloro-1,2,2-trifluoroethane | 135 | 1.7 |
| Dichlorodifluoromethane [2] | 142 | 2.6 |
| 2,2-Dichloro-3,3,3-trifluoroethane | 145 | 2.0 |
| 1,1,2,2-Tetrachloro-1,2-difluoroethane | 155 | 6.0 |
| 1,2-Dibromotetrafluoroethane | 164 | 3.3 |
| Trichlorofluoromethane | 165 | 2.2 |

[1] Average number of holes drilled to drill failure.
[2] Applied as a cold wet mist.

This example demonstrates the utility of the process of this invention in extending tool life and also compares the performance of a trichlorofluoromethane cutting fluid with other fluoro- and chlorofluorocarbons similarly used. It should be noted that the performance of the trichlorofluoromethane is clearly superior to that of the other chlorofluorocarbons and at least equal or superior to the performance of the fluorocarbons.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. The process of machining a metal in contact with a cutting fluid comprising lubricating amounts of trichlorofluoromethane.

* * * * *